March 23, 1965 E. L. CLARKE ETAL 3,174,446
POWER-ROTATED SOIL PENETRATING TOOL
Original Filed June 25, 1956 7 Sheets-Sheet 1

INVENTORS:
Evans L. Clarke
Walter J. Martens
By: Soans, Anderson, Luedeka & Fitch
Attys.

March 23, 1965   E. L. CLARKE ETAL   3,174,446
POWER-ROTATED SOIL PENETRATING TOOL
Original Filed June 25, 1956   7 Sheets-Sheet 2

INVENTORS:
Evans L. Clarke
Walter J. Martens
By: Soans, Anderson, Luedeka & Fitch
Attys.

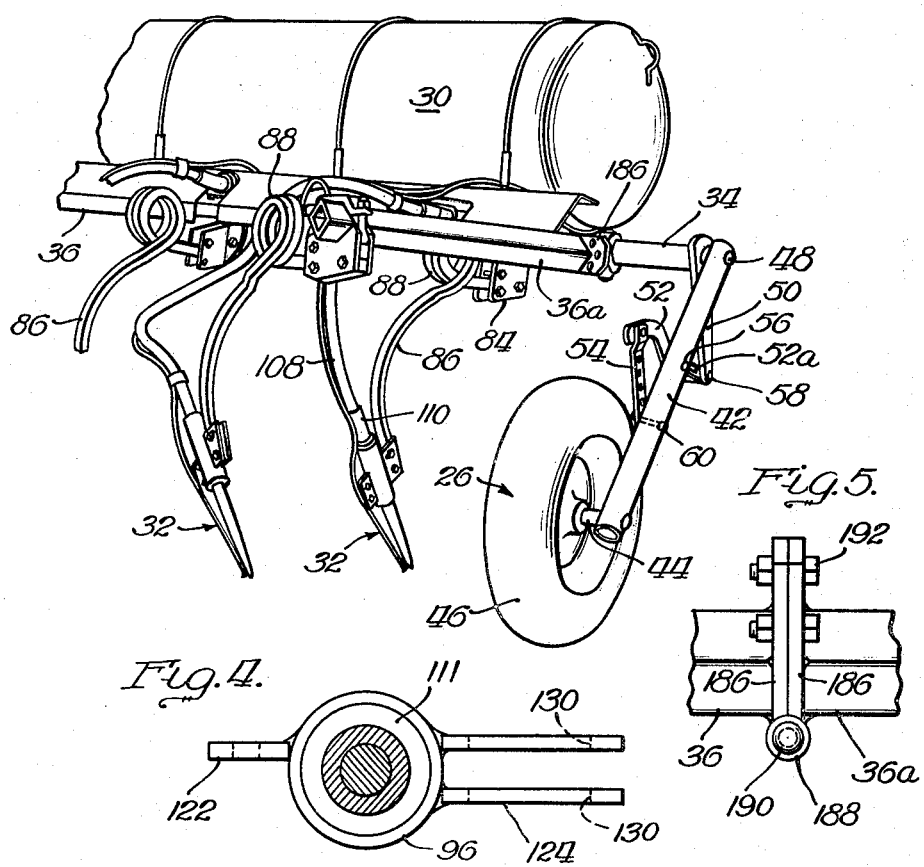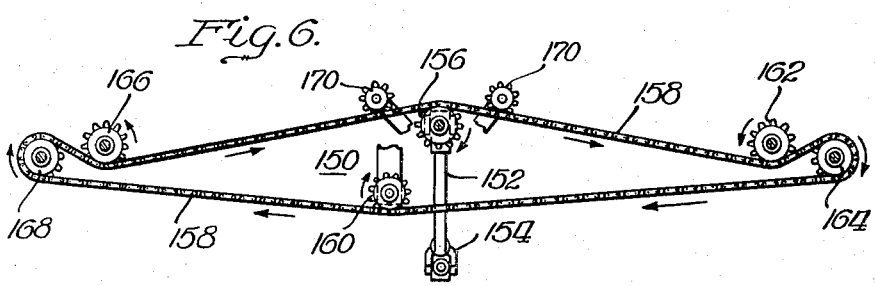

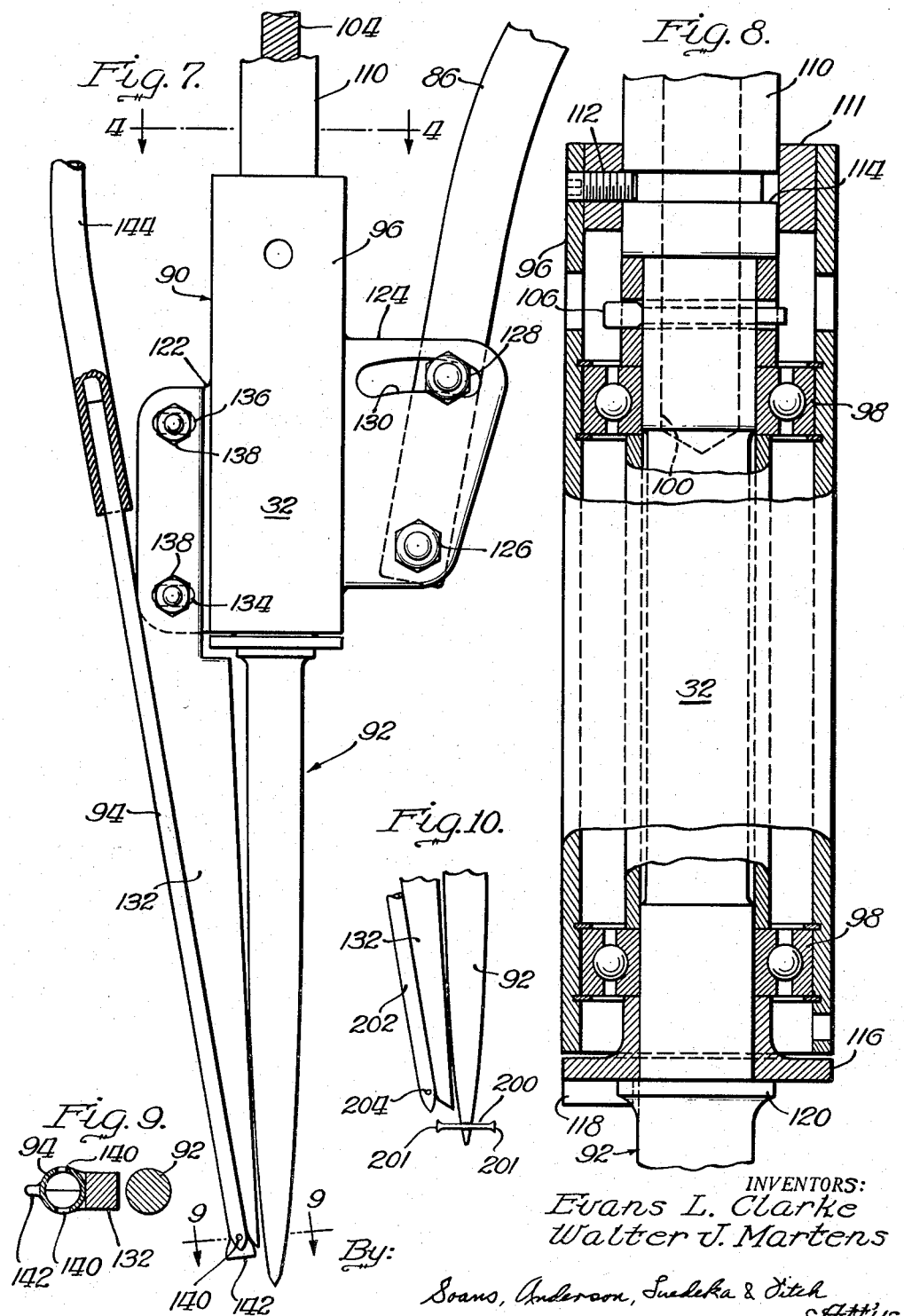

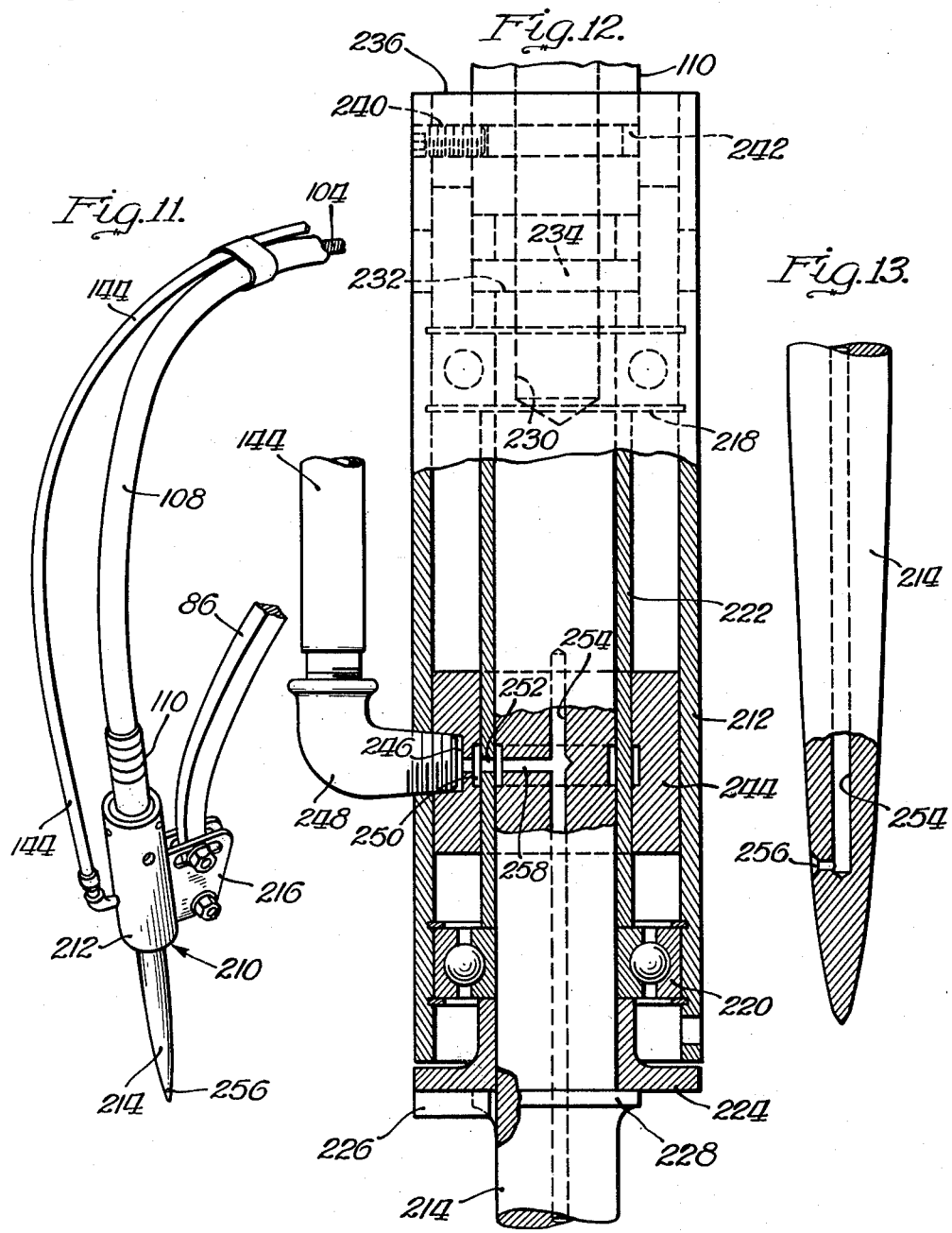

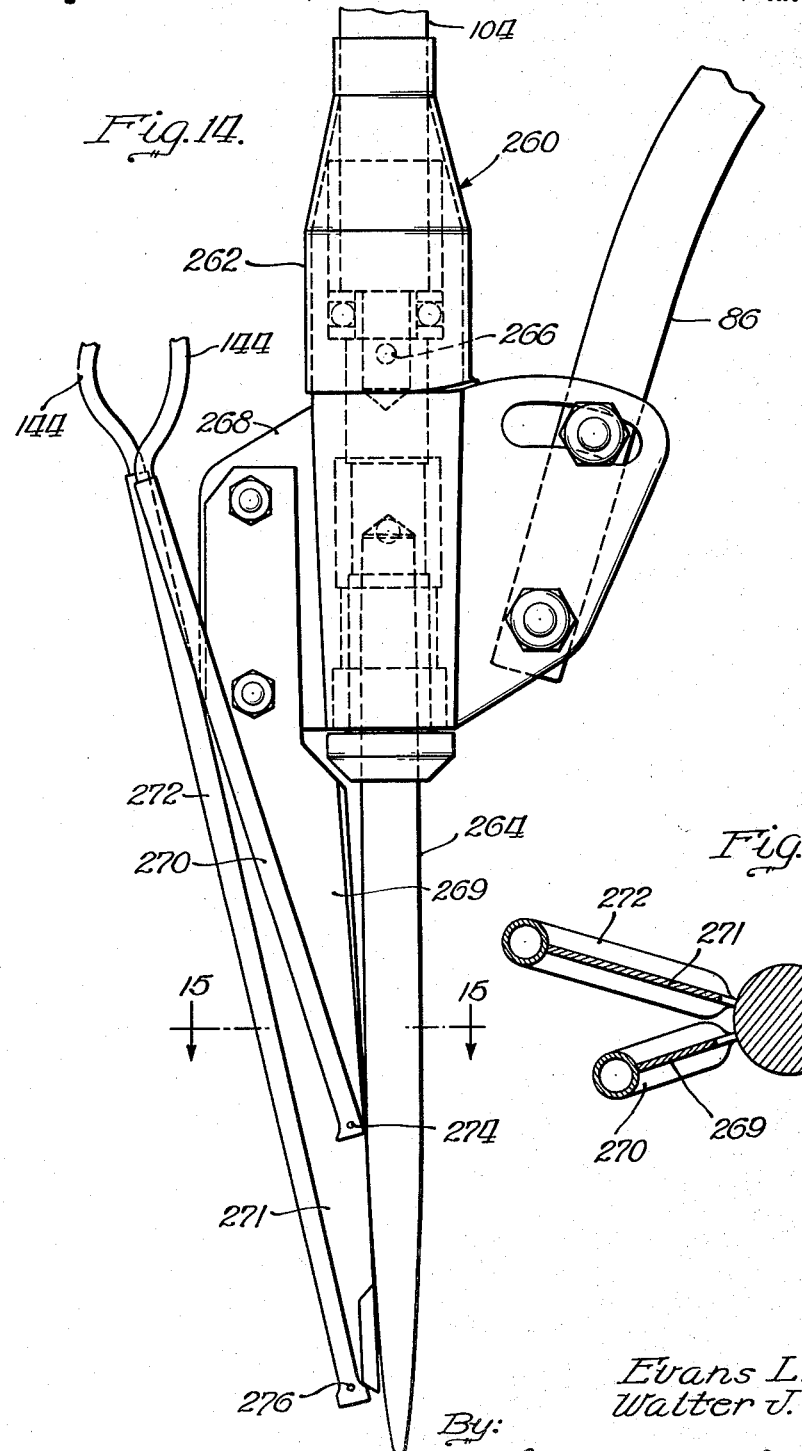

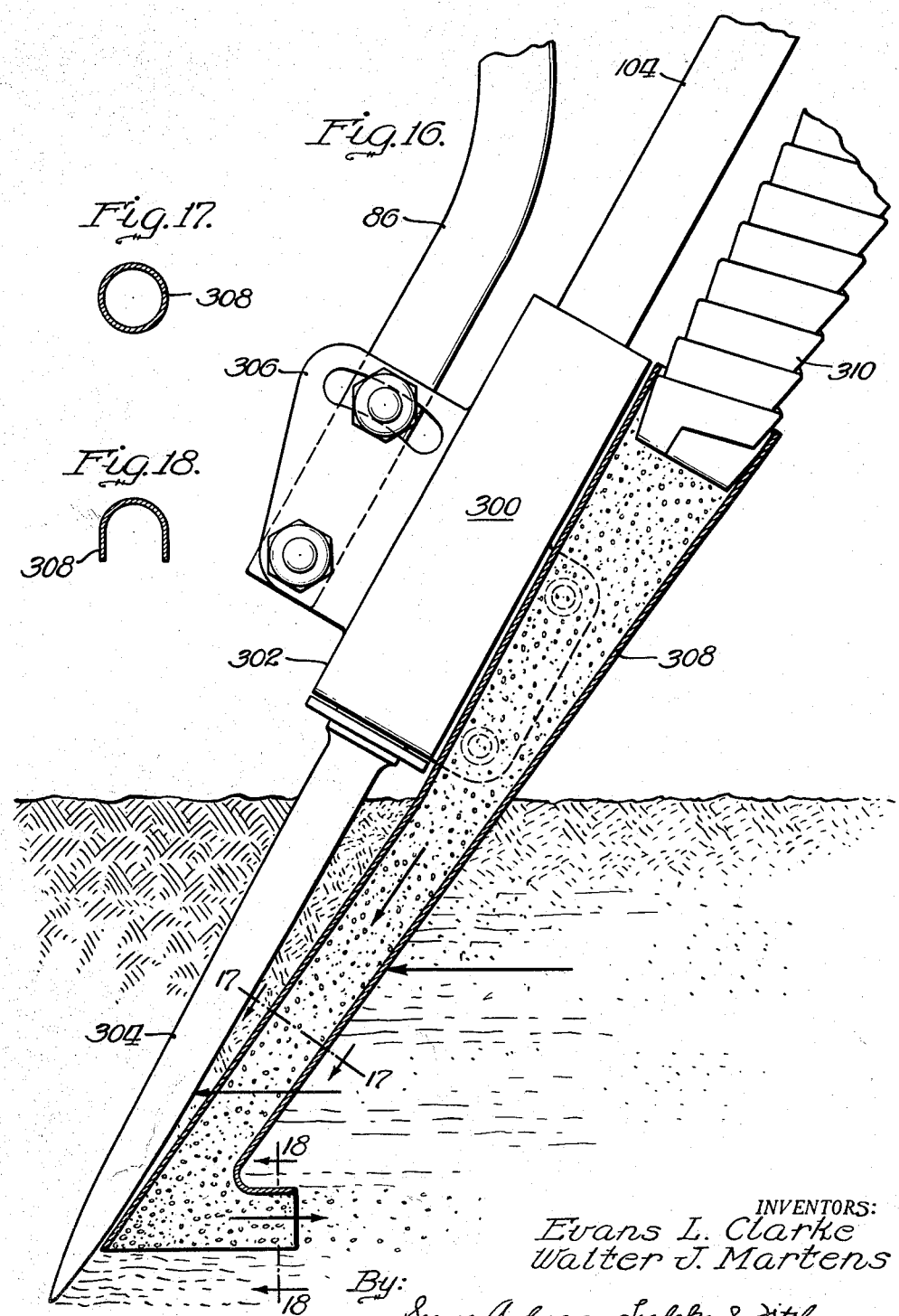

United States Patent Office 3,174,446
Patented Mar. 23, 1965

3,174,446
POWER-ROTATED SOIL PENETRATING TOOL
Evans L. Clarke, Sherrard, and Walter J. Martens,
Reynolds, Ill., assignors to J. I. Case Company, Racine,
Wis., a corporation of Wisconsin
Continuation of application Ser. No. 593,470, June 25,
1956. This application Aug. 21, 1961, Ser. No. 132,988
13 Claims. (Cl. 111—7)

This application relates to new and useful improvements in an agricultural implement and is a continuation of our copending application Serial No. 593,470, filed June 25, 1956, now abandoned.

The present invention relates generally to agricultural implements, and is particularly directed to an improved means for conditioning the soil.

The introduction of material, such as soil conditioners, fertilizers and the like, at a position below the ground level has become quite widespread in use in recent years and it is now generally recognized as a particularly satisfactory soil treating method. The use of such soil treatment makes possible for example, the addition of elemental fertilizers, such as nitrogen, to the soil in sufficiently concentrated form and in an area throughout the productive zone of the soil, to provide a considerable enrichment of the soil as noted by a very appreciable stimulation of plant growth.

Various implements have been provided for introducing fertilizing material below ground level, particularly in connection with the use of easily vaporizable or gaseous materials, such as free ammonia resulting from the use of liquified anhydrous ammonia. Generally, the implements provided for this purpose comprise one or more cultivating knives or shovels which are capable of operating below ground level and which include a conduit communicating with a source of fertilizer and terminating in a discharge opening adjacent the rear of the shovel. With devices of the type described, it is generally necessary to provide a trailing covering device for each knife, in order to provide means for covering the furrow formed by the knife. It will be appreciated, therefore, that the draft force required to move the knives through the ground at a practical depth, which is generally about six inches or more, as well as to pull the accompanying covering devices, is considerable. Moreover, the adjustments that are necessary for the tools used in such prior art devices, in order to attempt to maintain a desired depth of operation for the tools, are rather complex and not very satisfactory from the standpoint of the results achieved. Then too, in the use of an easily vaporizable substance or a gaseous material with the existing types of implements, there is usually a substantial loss of the fertilizer to the atmosphere, which is due primarily to the failure of the covering devices to adequately and promptly cover the open furrow after the fertilizer has been released by the implement. In this latter respect the type of tools frequently used leave a glazed, impervious slit which is not satisfactory for absorption of the material being discharged into the soil.

It is the principal object of the present invention to provide an improved method and apparatus for soil treatment. Another object of the invention is to provide a soil penetrating implement, which is power operated to provide easier penetration and movement through the soil, and which is effective to cover its own path as it moves through the soil. A further object of the invention is to provide a power-rotated soil penetrating implement, which minimizes the draft forces required to move the implement through the soil, and which is readily adjustable as to depth and angle of penetration, in order to provide for most efficient operation under varying conditions with respect to the growth and type of crops being treated, and the condition of the soil and the particular use being made of the implement.

Other objects and advantages will become apparent upon reading the following description of the selected embodiments illustrated in the accompanying drawings, wherein:

FIG. 3 is a view of a portion of the structure in FIG. 1, illustrating the folded position of the outer end of the implement.

FIG. 4 is a view taken along the line 4—4 in FIG. 7, with parts omitted.

FIG. 5 is an enlarged plan view of the hinge affording folding of the outer ends of the tool bar, which is seen in FIGS. 1 and 3.

FIG. 6 is a schematic illustration of the drive arrangement for the rotary tools shown in FIGS. 1 and 3.

FIG. 7 is an enlarged, side elevation of one of the tools seen in FIGS. 1 and 3.

FIG. 8 is an enlarged view of the bearing portion of the tool in FIG. 7, which is partly in section in order to illustrate internal details of the bearing.

FIG. 9 is an enlarged sectional view taken along the line 9—9 in FIG. 7.

FIG. 10 is a fragmentary view of a modified form of the tool shown in the previous figures.

FIG. 11 is a perspective view of another modified form of the invention.

FIG. 12 is an enlarged, fragmentary view of the upper portion of the tool structure in FIG. 10, partly in section.

FIG. 13 is an enlarged view of the lower portion of the tool structure in FIG. 12, partly in section.

FIG. 14 is an enlarged view of another modified form of the tool seen in the previous figures.

FIG. 15 is an enlarged sectional view taken along the line 15—15 in FIG. 14.

FIG. 16 is a side elevational view, partly in section, of still another modified form of the invention.

FIG. 17 is a sectional view taken along the line 17—17 in FIG. 16.

FIG. 18 is a sectional view taken along the line 18—18 in FIG. 16.

Figure 1:
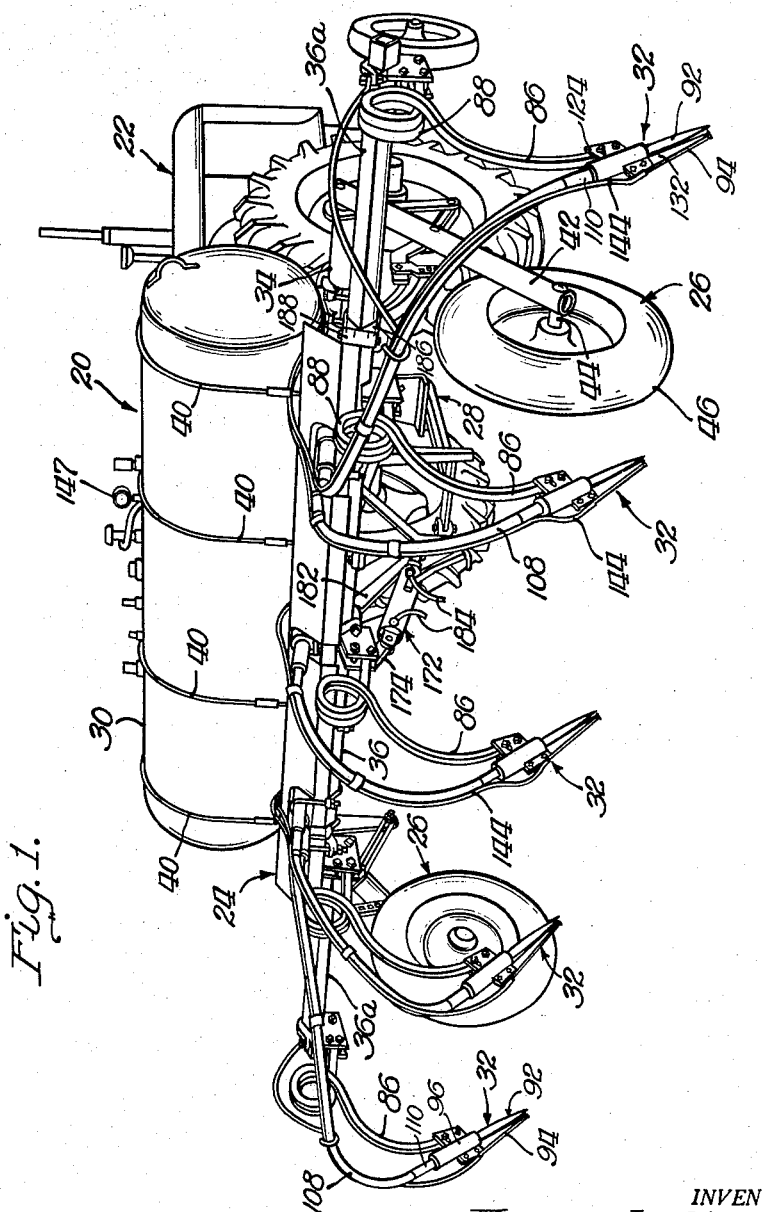
FIG. 1 is a perspective, rear view of a tractor-implement combination, which is illustrative of a selected embodiment of the invention.

With reference particularly to FIG. 1 of the drawings, it is seen that the principal embodiment selected to illustrate this invention comprises a fertilizer applicator 20 which is coupled with a tractor 22 in trailing relation thereto. The fertilizer applicator includes generally a main frame structure 24, supported by a pair of wheel structures 26 and the tractor drawbar 28, a tank 30 for containing a fluid soil-conditioning substance, and a plurality of soil-penetrating tools 32 adapted to introduce the soil-conditioning substance into the soil below ground level.

The frame structure 24 comprises a pair of elongated tubular members 34 and 36, which are disposed in spaced-apart, parallel relation and extend transversely of the direction of travel of the implement. A series of laterally spaced plate structures 38 (FIG. 2) connect the elongated frame members 34 and 36 at spaced intervals therealong, and these plate structures are shaped along their upper edges to provide a nesting support or saddle for the tank 30. The tank is releasably secured in position on the plate structure 38 by a series of ties or cables 40. As will be seen later, the plates 38 include bearing means receiving the forward frame member 34 so as to provide for vertical swinging movement of the remainder of the frame structure relative to the member 34.

The outer ends of the forwardmost frame member 34 each include a suitable bearing means (not shown) affording a pivotal mounting for the upper end of the wheel structure 26. More particularly, the wheel structure 26 (FIG. 3) includes an elongated tubular supporting post 42 having a spindle 44 at its lower end for rotatably mounting a wheel 46, and including a spindle 48 at its upper end which is rotatably mounted in the above-mentioned bearing means at the outer end of the frame member 34. Adjustment of the angular position of the wheel supporting post 42, and consequently of the elevation of the frame 24 above the ground, is provided by means including a depending arm 50 fixed to the end of frame member 34, a lever 52 pivotally connected at one end to the lower end of the arm 50, and a link 54 pivotally connected between the opposite end of the lever 52 and an intermediate portion of the whele supporting post 42. The lever 52 includes a slotted portion 52a for receiving a bolt 56 carried by the post 42 as well as a bolt 58 at the lower end of the arm 50, in adjustably fixed relation along the slot, and the link 54 includes a series of bolt-receiving openings along its length for selectively securing its lower end to the post 42 by means of a bolt 60.

A pair of the plate structures 38 (FIG. 2), which interconnect the transverse frame members 34 and 36 and which are located on opposite sides of the center line of the implement 20, are provided at their forward ends each with a generally vertically disposed, pin-receiving portion 62 affording a hinged connection with the drawbar coupling which is indicated generally at 64. The coupling 64 comprises a pair of plate structures 66 each including a hinge portion 68 at its upper end, complementary to the portion 62 of the plate 38, which is pivotally connected to the plate 38 by a pin 70.

The plates 66 extend downwardly and forwardly from the implement frame 24, and each of these plates includes a bifurcated portion at its forward end which is provided with a vertically spaced-apart series of pairs of aligned openings 72. The openings 72 afford selective, pivotal mounting of a clevis 74 on the forward end of the plate 66, by means of a pin 76 extending through an opening (not shown) in the clevis and a selected pair of the openings 72. The clevises 74 thus positioned on the ends of the plates 66 are in turn pivotally mounted, through pins 78, in laterally spaced relation along the transverse portion 80 of a T-drawbar 82 which is fixed in rearwardly extending relation on the tractor 22. The described coupling ararngement between the tractor and implement provides a support for the forward portion of the implement 20 which affords close coupling of the two, and improved trailing action of the implement, principally through the universal movement afforded by the described coupling. Further, this coupling arrangement provides for a location of the center of draft, during movement of the tractor-implement combination, at or immediately forward of the axis of the rear driving wheels of the tractor, and thereby provides for a maximum utilization of the tractive effort that can be expended by the tractor.

The rearwardly disposed frame member 36, which extends transversely of the implement 20 provides a support for the tools 32 and is preferably in the form of a tube of rectangular cross-section. More particularly, the tools 32 are adjustably positioned in laterally spaced relation along this tool bar 36 by means including a clamp 84 which includes means for receiving the forward end of a tool supporting element in the form of a metal shank 86. The latter is preferably of spring steel and includes one or more coiled portions 88 to thereby afford sufficient resiliency to permit yielding when the tool carried at the lower end of the shank strikes an obstruction. However, any known means of mounting the tools 22 may be substituted.

The soil penetrating portion of the tool, which is carried at the lower end of the shank 86, comprises generally a bearing portion 90 (FIGS. 7 and 8), a spindle or tapered rod 92 rotatably mounted in the bearing 90 in coaxially extending relation thereto, and a tube 94 extending along the rearward side of the spindle 92 which tube provides means for the flow of soil conditioning material or the like to a position adjacent the lower end of the spindle.

The bearing 90 includes a cylindrical housing 96 (FIG. 8) which has fixed therein a pair of antifriction bearing mountings 98 for rotatably receiving the upper end of the spindle 92 in axially fixed relation to the bearing housing 96. The upper end of the spindle 92 is provided with an axially disposed bore 100, which is adapted to receive the end portion 102 of drive transmission means in the form of a flexible power shaft 104. The power shaft is preferably fixed in position in the spindle bore 100 by a pin 106 or the like, which is disposed through aligned openings in the shaft 104 and the spindle 92. The power shaft 104 is rotatably disposed within a suitable flexible tubing 108 (FIG. 3) and a metal sleeve or fitting 110 is provided at one end of the tubing for insertion into a circular plug 111 in the upper end of the bearing housing 96. The sleeve 110 is held in place by a set screw 112 (FIG. 8) which is disposed through an opening in the side of the housing 96 and engages a peripheral groove 114 in the sleeve 110.

The lower end of the bearing housing 96 is substantially closed by a flanged sleeve or "slinger" 116, which is disposed for rotation with the spindle and which includes a key 118 projecting downwardly therefrom and extending into a slot formed in a shoulder portion 120 on the spindle. The lower portion of the spindle, which extends downwardly from the shoulder 120, is tapered to afford easier penetration of the soil. In the illustrated embodiment the lower portion of the spindle 92 is generally conical, preferably a semi-cubical paraboloid.

The bearing housing 96 also has fixed thereto a pair of brackets 122 and 124 which are disposed in generally diametrically opposed positions along the outside of the housing. The bracket 124 includes a pair of spaced-apart plates, extending in the direction of the axis of the housing 96, which are adapted to receive the tool supporting shank 86 therebetween. Suitable pairs of aligned bolt receiving openings are provided in the bracket 124, which are alignable with a similarly spaced pair of openings through the shank 86 to receive a pair of bolts 126 and 128. Preferably one of the aligned pairs of bolt receiving openings in the bracket 124 is slotted, as at 130, to provide for angular adjustment of the bearing housing and spindle relative to the supporting shank 86.

The other bracket 122 provides the support for the tube 94 which extends lengthwise of the spindle and which serves as a conduit for the fertilizer or other material being introduced into the soil. The tube 94 is suitably fixed, as by welding, to an elongated plate member 132 which includes a pair of openings 134 and 136 at its upper end. These openings are alignable with similarly spaced openings in the bracket 122 to receive suitable fastening elements, such as the bolts 138. One or both of the openings receiving the bolts 138 are preferably elongated or slotted to provide for adjustment of the distance between the lower end of the tube 94 and the spindle 92. As seen particularly in FIGS. 7 and 9, the lower end of the tube 94 is provided with a pair of diametrically opposed openings 140 to permit flow of material from the tube, and the tube also preferably includes a fin 142 at the lower end of the tube which extends in the direction of travel of the tool.

The upper end of the tube 94 has fluid communication with a suitable source of the material to be dispensed, such as the tank 30, as through the flexible hose or tube 144 which extends to a valve controlled manifold 146 (FIG. 2) on the tractor or tank for controlling the flow of fluid material from the tank 30 to the tools 32. In the illustrated embodiment, the easily vaporizable soil conditioner, such as liquified anhydrous ammonia, is kept under pressure in the tank 30 and is delivered through a suitable control means 147 and a flexible conduit or hose 148 to the manifold 146 where it is dispensed through the several hoses 144 to the soil penetrating tools.

With respect to the delivery of liquid anhydrous ammonia from the tank 30 to the dispensing tubes 94 associated with each of the tools 32, it is important that the tubing and valves utilized in the system provide for a controlled pressure on the anhydrous ammonia to prevent premature vaporization of the liquified material in the system so as to provide proper distribution of the fertilizer to the soil. In order to achieve this control of the state of the fertilizer material, it is desirable that the anhydrous ammonia be delivered to the soil under pressure and through conduits which permit very little or no expansion of the liquified material. It will be noted that the conduits used in the disclosed system are of progressively smaller internal cross-sectional area as they approach the outlets 140 at the lower ends of the tubes 94. Further, the manifold 146 is designed to prevent any appreciable expansion of the liquified material as it is metered into the separate conduits 144.

The rotatable spindle 92 for each of the tools 32 is driven from the power take-off on the tractor 22 through a suitable drive means, such as that shown schematically in FIG. 6. A chain and sprocket drive means 150 is supported by the implement frame structure 24, preferably at a position below the tank 30, and includes a drive shaft 152 which is connected to the tractor power-take-off through a universal drive coupling 154 or the like. The rearward end of the drive shaft 152 is connected to a drive gear or sprocket 156 which engages an endless chain 158 disposed around a series of several sprockets 160, 162, 164, 166 and 168. The latter are suitably rotatably mounted on the implement frame structure and are fixed in driving relation, respectively, to the several flexible shafts 104 to thereby drive the rotatable spindles 92. Suitable idler sprockets 170 afford adjustment of the tension in the chain 158. The use of belts and pulleys is also contemplated.

It should be particularly noted that the preferred drive arrangement for the several tools is such that the tools disposed on opposite sides of the center line of the implement, which is also approximately the line of draft, rotate in opposite directions. This is desirable in order to avoid side-drifting of the implement under the influence of the rotating spindles.

Figure 2:
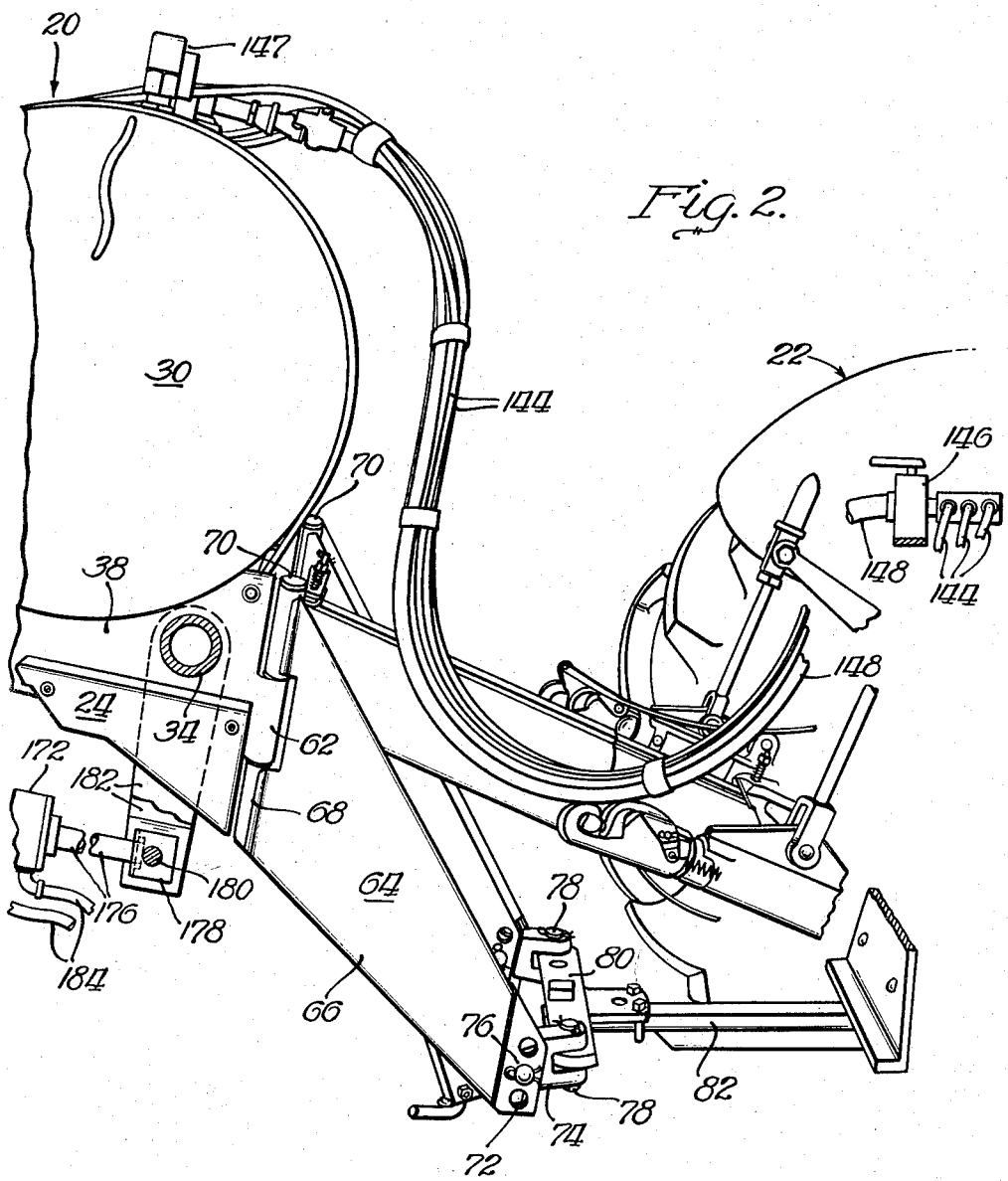
FIG. 2 is an enlarged side view, in perspective, of a portion of the structure in FIG. 1, showing the coupling between the tractor and implement.

Suitable means is provided for raising and lowering the tools 32, as a unit, relative to the ground. As seen in FIGS. 1 and 2, the lift mechanism employed herein is hydraulically operated and includes a double-acting ram 172 having its cylinder portion pivotally connected to a bracket 174 on the tool-mounting bar 36. The free end of the piston rod 176 for the ram 172 is connected to a trunnion block 178 (FIG. 2) which is pivoted on a bolt 180 extending between a pair of arms 182 fixed to the forward frame member 34 in depending relation thereto. A pair of hoses 184 extend from opposite ends of the ram cylinder to a suitable source of fluid pressure (not shown) on the tractor.

It is seen, therefore, that operation of the hydraulic ram 172 is effective to produce a swinging movement of the rearward frame member 36, which mounts the several tools 32, relative to the forward frame member 34, to thereby cause a corresponding vertical movement of the tools.

Although any practical number of soil-penetrating tools may be employed in this invention, the described implement utilizes five of the power operated tools 32 and these are preferably balanced in their placement with respect to the line of draft of the implement. Further, provision is made for folding the outer end portions of the tool bar 36, in order to facilitate passage of the implement through gates and other confined places. As seen particularly in FIGS. 3 and 5, the outer end portions 36a of the tool bar 36 are connected to the main central portion by a pair of flanges 186 including hinge portions 188, through means of a hinge pin 190 extending through the hinge portions and one or more bolts 192 positioned through the flanges at the side thereof opposite the hinge. Consequently, after removing the bolts 192 the bar portion 36a can be swung rearwardly as seen in FIG. 3 to reduce the overall width of the implement, as for transport purposes. Of course, one or both of the bars 36a may be completely removed, if such is desired.

It will be seen, therefore, that in the operation of the above-described implement there is afforded means for causing an easily vaporizable substance, which is maintained under pressure within the fluid delivery system, to flow in selected quantities into each of the hoses 144, thence into the associated tube 94 and out the openings 140 adjacent the lower end of each of the soil-penetrating tools 32. Also, power driven means is provided to afford controlled rotation of the spindles 92, with the spindles on one side of the line of draft being rotated in a direction opposite the direction of rotation of the spindles on the opposite side, to thereby provide for a balancing of the lateral forces created by operation of the tools.

The depth of penetration of the tools is selectively adjusted through the adjustable positioning of the implement supporting wheels 46 relative to the frame 24, as shown in FIG. 3, and through operation of the hydraulic ram 172 which provides for vertical movement of the tool bar 36 relative to the forward frame member 34 and the wheels 46 facilitated by the usual ram stop arrangement. Additionally, the angle at which the rotating spindles 92 enter the ground is adjustable through means of the slotted openings 130, seen particularly in FIG. 7. In this respect, it is believed preferable that the spindles enter the ground in a downwardly and forwardly inclined position at about a 20° angle, with respect to the vertical with their lower ends leading, as seen in FIGS. 1 and 3, for normal use. However, this will vary with the condition of the soil. For example, when the soil includes considerable trash or is covered with grass etc., it has been found advantageous to have the spindles 92 enter the ground at approximately 90° with respect to the ground level.

The spindles 92, are, of course, rotated as they are moved into engagement with the soil and are moved to a depth of penetration wherein the point is approximately 6 inches or more below ground level. Also, the anhydrous ammonia or other material being introduced into the soil is preferably caused to flow through the fluid delivery system either a little before or immediately after the spindles 92 enter the ground, so as to maintain a pressure in the tubes 94 and keep the holes 140 in an open condition.

The rotation of the spindles 92 is very effective in facilitating the penetration of the soil by the tools and, also, in making it easier to move the tools forwardly through the soil. This is very advantageous in that it greatly reduces the supportive forces ordinarily encountered with soil engaging shovels or knives and the like, and consequently, reduces the amount of power required to pull the implement. Additionally, and of even greater importance, the rotation of the spindles 92, as the implement is pulled along the ground, provides for a loosening of the soil by abrasion which results in a granulation of the soil. The soil in granular form is more capable of absorbing the soil-conditioner, particularly gaseous or easily vaporizable materials such as anhydrous ammonia, than are the lumps and slices of soil normally produced by action of the usual soil engaging tool. By pulverizing the soil the moisture is made more readily available to the anhydrous ammonia, or other gaseous or liquid form of fertilizer. Furthermore, there is thereby exposed a greater surface area of oil which expedites the ion exchange between the ammonium (NH₄) ions and the calcium, sodium, etc. ions present on the soil particles.

The rotation of the spindles 92 and the close relationship thereto of the discharge port 140 for the material being delivered to the soil offers further advantages in that the spindle, in effect, covers its own path or furrow by throwing the soil rearwardly of the spindle. Consequently, no additional covering means is required. This feature also produces a further saving in power requirements over the previous devices which required some form of furrow-covering tool. Moreover, the granular form of the soil produced by the rotating spindles provides a much better seal for gaseous or vaporizable materials that are introduced into the soil below ground level.

It should also be noted that the novel arrangement provided for coupling the implement to the tractor, as seen particularly in FIG. 2, affords definite advantages in allowing movement of the implement to follow the contour of the ground, thereby providing even penetration of the soil-engaging tools, while providing for a close relationship between the tractor and implement so that the latter closely follows the path of the tractor and does not tend to produce any appreciable side draft while turning with the tractor.

Further advantages may be gained in certain instances by adding a cutter element 200 to the spindle 92, as seen in FIG. 10. This cutter element may be of any suitable form and is fixed to the spindle for rotation therewith. As illustrated, the cutter 200 comprises an elongated arm having a pair of cutting edges 201 disposed at opposite ends thereof. Furthermore, in the modified structure the dispensing tube 202 for the soil-conditioner is simply closed at its lower end and does not include the fin 142 of the previous embodiment, although either form of tube may readily be used. The openings 204 at the lower end of tube 202 provide discharge openings for the soil-conditioner or other material being dispensed, in the manner of the principal embodiment.

A further modification of the invention is illustrated in FIGS. 11-13, wherein the tool shank 86 is adjustably connected to a rotary tool 210, comprising a cylindrical bearing housing 212, and a spindle 214 which is fixed at one end within the housing 212 and is attached to the flexible power shaft 104 for rotation therewith. The housing 212 has fixed thereto a bracket 216 for adjustably securing the tool to the resiliently mounted shank 86, in the manner described above with respect to the embodiment shown in FIGS. 1-9.

Within the housing 212 (FIG. 12) there is provided means for rotatably receiving the spindle 214, including a pair of antifriction type bearings 218 and 220, a spacer sleeve 222 disposed between the bearings, and a flanged sleeve 224 which is positioned at the lower end of the housing and includes a key 226 engaging a shoulder 228 on the spindle, in the manner of the previously described embodiment. The upper end of the spindle includes an axial bore 230 for receiving the end of the power shaft 104, with alignable openings 232 and 234 in the spindle and shaft, respectively, adapted to receive a pin (not shown) for securing the two together. A plug 236 in the upper end of the housing is adapted to receive the metallic sleeve 110 on the end of the hose 108 which encloses the flexible power shaft. A set screw 240 through an opening in the side of the housing 212 is adapted to engage a peripheral groove 242 in the sleeve 110 to maintain it in position relative to the bearing housing.

Intermediate the ends of the bearing housing 212 there is provided a bushing 244 which includes a transverse threaded bore 246 in alignment with a similar bore in the side of the housing, the bore thus provided being adapted to receive an elbow fitting 248. The hose 144 which carries the soil-conditioner, such as anhydrous ammonia, from the tank 30 is suitably coupled to the elbow 248 to provide fluid communication therebetween. The inner end of the bore 246 within the housing 212 is reduced in size and extends through to an annular recess 250 which is formed around the inside of the bushing 244 and around the outside of the spindle 214. An opening 252 in the spacer 222 provides fluid communication between opposite sides thereof disposed within the recess 250.

The spindle 214 also includes an axial bore 254 which extends from a location above the position of the elbow 248 to a discharge port 256 (FIG. 13) adjacent the lower end of the spindle. A lateral passage 258 provides fluid communication between the upper end of the axial bore 254 in the spindle and the annular recess 250. Thus it is seen that there is provided means for allowing the flow of fluid or fluid-borne materials from the hose 144 through the elbow fitting 248 and bore 246 into the annular recess 250, and then through the passage 258 and bore 254 to the outlet 256 at the lower end of the spindle.

The modification described above with respect to FIGS. 11-13 is particularly advantageous in that it provides a tool affording introduction of material below the surface of the ground, wherein only the rotating soil-penetrating tool enters the ground. This affords an appreciable reduction in the power required to effect said penetration, as well as a reduction in the draft force required to pull the implement.

Still another modification is seen in FIGS. 14 and 15, wherein the tool shank 86 is adjustably connected to a rotary tool 260 comprising a cylindrical bearing housing 262 and a spindle 264, which is suitably fixed at one end within the housing and is attached to the flexible power shaft 104, as by a pin 266, for rotation therewith. The housing 262 has fixed thereto a bracket 268 for adjustably securing the tool to the shank 86, in the manner described above with respect to the principal embodiment, and for supporting a plurality of conduits or tubes which are connected with a source of the fertilizer or other material to be introduced into the soil. The tubes extend lengthwise of the spindle 264 and are provided at their lower end portions with suitable openings to permit the flow of material from the tubes.

The discharge tubes are supported on the bracket 268 by a pair of plates 269 and 271, and the tubes are indicated at 270 and 272 with openings 274 and 276, respectively, at their lower ends to permit the flow of material from the tubes. The upper end of each tube is suitably connected to a flexible hose 144 or the like which extends to a source of material, such as the tank 30 in FIG. 1.

By providing a plurality of discharge tubes for each of the rotary spindles 264 there is afforded a greater volume of discharge of fertilizer or other material as the tool 260 moves through the soil. Furthermore, by disposing the outlets of the discharge tubes at different levels below the ground there is provided more effective coverage of the soil, particularly when the depth of operation of the rotary tool 260 is large and the material being discharged is intended to permeate or be distributed throughout a very thick layer of soil. In order to avoid any undue resistance to the movement of the tool through the soil, it is preferred that the discharge tubes and the plates connecting them with the bracket 268 be located as close together as possible, preferably within the path formed by the rotary tool 260.

With reference to FIGS. 16-18, it is seen that the previously described rotary tool may also be used to advantage with solid materials. More particularly, this additional embodiment includes a rotary tool 300 comprising a cylindrical housing 302 and a spindle 304, which is fixed at one end within the housing and is suitably attached to the flexible power shaft 104 for rotation therewith. A bracket 306 on the housing 302 provides an adjustable connection with one of the tool supporting shanks 86 and also provides a support for a seed boot 308 or the like which is disposed along the rearward side of the rotary tool.

The seed boot 308 is generally cylindrical in section and terminates at its lower end in a rearwardly extending inverted U-section having a discharge opening in the path of the lower end portion of the rotating spindle 304. The upper end of the seed boot 308 is suitably connected with a flexible conduit 310 which extends upwardly to a source of the seed or other material being discharged into the soil. It is apparent, therefore, that the seed or the like will be dispensed below the soil within the path of the rotating spindle 304 and will be covered by the granular soil particles formed by the action of the rotating spindle.

It is seen, therefore, that the present invention provides a novel arrangement for a soil working tool and for introducing material, whether gaseous, solid or liquid, below the soil. Although shown and described with respect to particular embodiments which are particularly adapted to the introduction of material below ground level, it should also be appreciated that the power rotated tools have utility of themselves as soil-breakers or scarifiers, as a tillage tool for working close to the root zone of plants, as a harvesting tool to loosen soil about root plants such as carrots, beets and potatoes prior to lifting of the root from the soil. Furthemore, it will be appreciated that this invention has utility in connection with the introduction of materials such as pesticides into the soil for the control of either plant or animal life, and as an aerator or for injection of aeration chemicals such as sulfuric acid or krillium into the soil.

It will also be seen that, although described with respect to particular embodiments, other forms of apparatus may be used without departing from the principles of this invention.

We claim:

1. An implement comprising a frame mounted on a mobile support including drive mechanism, a tool bar, means connecting said tool bar and said frame in a manner locating said tool bar in transverse relation to the line of travel of said mobile support and in a manner affording vertical adjustment of said tool bar relative to said frame, a plurality of resilient tool supports fixed to said tool bar in laterally spaced relation to one another and having yieldingly shiftable free end portions, a tubular bearing means adjustably fixed to the free end portion of each of said tool supports, an elongated, generally vertical spindle rotatably mounted in each of said bearing means, flexible drive means connecting each of said spindles with said drive mechanism, a container for soil treatment material on said support, a conduit carried by each of said tubular bearing means at a position rearwardly adjacent thereto and terminating in an opening at its lower end which is disposed adjacent to the lower end of said spindle, and means providing fluid communication between said container and the upper end of each of said conduits.

2. An agricultural implement comprising a mobile support, a bearing-means-supporting element, means connecting said supporting element and said mobile support in a manner affording vertical adjustment therebetween, a bearing means for a rotatable tool, means connecting said bearing means and said supporting element in a manner affording angular adjustment therebetween in a generally vertical plane disposed generally parallel to the line of travel of said mobile support, a tool comprising an elongated spindle rotatably mounted in said bearing means for projection in a manner affording soil penetration and tillage along a continuous path determined by the movement of said support along the ground, said spindle including a smooth surfaced, downwardly tapering end portion of decreasing generally circular cross-esction, and drive means on said support connected to said spindle for rotating the same.

3. An agricultural implement comprising a mobile support, a bearing-means-supporting element, means connecting said supporting element and said mobile support in a manner affording vertical adjustment therebetween, a bearing means for a rotatable tool, means connecting said bearing means and said supporting element in a manner affording angular adjustment therebetween in a generally vertical plane disposed generally parallel to the line of travel of said mobile support, a tool comprising an elongated spindle rotatably mounted in said bearing means and projecting in a manner affording soil penetration and tillage along a continuous path determined by the movement of said support along the ground, said spindle including a smooth surfaced, downwardly tapered end portion of downwardly decreasing generally circular cross-section, drive means on said support connected to said spindle for rotating the same, a source carried by said mobile support for material to be introduced into the soil, and means carried by said mobile support for feeding material from said source to the region of soil adjacent the lower end of said rotating spindle.

4. An agricultural implement for use with a mobile support comprising a bearing-means-supporting element, means connecting said supporting element and said mobile support in a manner affording vertical adjustment therebetween, a bearing means mounted on said bearing-means-supporting element in a generally vertical plane disposed generally parallel to the line of travel of said mobile support, a tool comprising an elongated rotating spindle rotatably mounted in said bearing means and projecting downwardly and forwardly therefrom at an angle suitable to provide soil penetration along a continuous path determined by movement of said mobile support along the ground, a fluid motor connected between said mobile support and said bearing-means-supporting element for selectively raising the latter and providing for downward pressure thereon for forcing said tool into the ground, and said elongated spindle having a smooth surfaced downwardly tapering end portion of decreasing generally circular cross section positioned to engage the ground when said bearing-means-supporting element is adjusted downwardly by said fluid motor, to penetrate the ground by reason of rotation of said spindle and its forward inclination, said smooth surfaced end portion extending for the entire length of that part of the spindle intended to engage the ground, and drive means on said support connected to said spindle for rotating the same.

5. A fertilizer applicator comprising a mobile support, a resilient tool support having a depending free end portion, means mounting said tool support on said mobile support providing for up-and-down movement of said tool support relative to said mobile support, said tool support terminating at its free end in a depending portion, an upwardly directed bearing means, means on said bearing means mounting said bearing means on said depending portion of said tool support for adjustment in a plane generally parallel to the direction of travel of the implement, means carried by said bearing means defining an open ended generally downwardly directed conduit, a fertilizer container on said mobile support, means providing for the passage of fertilizer from said container to said conduit, an elongated downwardly tapered spindle rotatably mounted in said bearing means and presenting a generally smooth outer surface, said spindle being disposed immediately forwardly of said conduit whereby to make a path in the soil for said conduit by reason of movement of said mobile support, a power driven means on said mobile support and means connected with said power driven means and with said spindle for rotating said spindle during its progress through the soil.

6. An applicator for materials to be added to the soil below ground level comprising a traveling support, a tool supporting shank, means movably connecting said supporting shank with said traveling support for yielding movement relatively thereto, means connected with said supporting shank and with said traveling support providing up-and-down adjustment of said shank relative to said traveling support, said tool supporting shank having a free end spaced from its connection with said traveling support and terminating at said free end in a generally downwardly directed bearing means, a smooth surfaced elongated spindle rotatably mounted in said bearing means in depending relation thereto, a plurality of conduits fixed in relation to said bearing means and extending lengthwise of said spindle, each of said conduits having an opening therein adjacent said spindle, the several openings being disposed in spaced relation lengthwise of said spindle, power driven means on said traveling support, means connected with said power driven means and with said spindle for rotating the latter by reason of actuation of said power driven means, material containing means carried by said traveling support, and means providing a plurality of passageways connecting said material containing means with said conduits for feeding material from said material containing means to each of said conduits.

7. An agricultural implement comprising a traveling support, a tool bar, drive means on said traveling support, means movably connecting said tool bar with said traveling support to provide up-and-down movement of said tool bar relative to said traveling support, a rotatable rod positioned in depending relation on said tool bar and forwardly inclined for penetrating and tilling the soil along a path of travel determined by the direction of travel of said traveling support, said rod having a downwardly tapering end portion of decreasing, generally circular cross section and a smooth surface extending the entire length of the portion of said rotatable rod intended to engage the ground, and means connected to said drive means and to said rotatable rod whereby to cause rotation of said rod by reason of actuation of said drive means.

8. A soil working and fertilizing implement for supplying a free-flowing substance to the soil comprising a mobile tool-supporting structure, a source of the substance to be dispensed carried by said supporting structure, a tool, comprising a power operated rotatable element having a tapered end portion of downwardly decreasing generally circular cross-section for penetration and tillage of the soil along a continuous path determined by the travel of said tool supporting structure, said smooth end portion extending the entire length of that portion of said rotatable element intended to engage the soil, means mounting said tool on said supporting structure in a downwardly and forwardly inclined position and affording relative movement therebetween to and from a soil penetrating position, means carried by said supporting structure and connected with said tool for rotation thereof, means carried by said supporting structure defining a conduit extending alongside said element and having an opening adjacent the lower end of said element, and means connected with said conduit and with said source of substance and affording fluid communication therebetween.

9. A fertilizer applicator comprising a mobile support, a fertilizer container on said mobile support, a plurality of laterally spaced apart, depending tool shanks on said support, each terminating in a generally downwardly and forwardly directed bearing means, an elongated, tapered spindle rotatably mounted in each of said bearing means, said spindle having generally smooth outer surfaces and each spindle including an axial bore extending longitudinally of the spindle and terminating adjacent the lower end of said spindle in an opening providing communication with the outside surface of the spindle, power driven means on said mobile support, means connected with each of said spindles and with said power driven means for rotating said spindles by reason of actuation of said power driven means, and means connected with said axial bores and with said fertilizer container defining passageways for the flow of fertilizer from said container to the axial bores in said spindles.

10. An agricultural tool comprising a downwardly and forwardly directed spindle, a tubular bearing rotatably supporting said spindle at one end, a tool shank, said tubular bearing being detachably secured to said tool shank in a manner affording angular adjustment of said bearing relative to said tool shank, said spindle being formed with an axial bore extending through a substantial portion of its length and terminating in an opening adjacent the other end of said spindle, the outer surface of said spindle being generally smooth and tapering toward a point at said other end, means connected with said one end of said spindle and adapted for connection with a powered driving means, and means connected with said one end and adapted to provide fluid communication between the upper end of said axial bore and a source of material to be dispensed by said tool.

11. An implement comprising a mobile support, including drive mechanism, a tool bar, means connecting the tool bar with the mobile support in a manner locating said tool bar in transverse relation to the line of travel of said mobile support, and in a manner affording vertical adjustment of said tool bar relative to said mobile support, means connected to said mobile support and to said tool bar for raising said tool bar at will, a plurality of tool supports fixed to said tool bar in laterally spaced relation to one another, each of said tool supports including a tubular bearing means fixed thereto, an elongated forwardly and downwardly directed spindle rotatably mounted in each of said tubular bearing means for projection at an angle suitable to provide soil penetration along a continuous path determined by the movement of said support along the ground, said spindles each including a smooth surfaced downwardly tapering ground engaging end portion extending for the entire length of that part of the spindle intended to penerate the ground, said ground engaging portion being of downwardly decreasing generally circular cross section, and drive transmission means on said support connected to said spindle and to said drive mechanism for rotating said spindles.

12. An implement comprising a mobile support, including drive mechanism, a tool bar, means connecting the tool bar with the mobile support in a manner locating said tool bar in transverse relation to the line of travel of said mobile support, and in a manner affording vertical adjustment of said tool bar relative to said mobile support, means connected to said mobile support and to said tool bar for selectively raising the latter, and said means being constituted to lower said tool bar and to exert downward pressure thereon, a plurality of tool supports fixed to said tool bar in laterally spaced relation to one another, each of said tool supports including a tubular bearing means fixed thereto, an elongated forwardly and downwardly directed spindle rotatably mounted in each of said tubular bearing means for projection at an angle suitable to provide soil penetration along a continuous path determined by the movement of said support along the ground, said spindles each including a smooth surfaced downwardly tapering ground engaging end portion extending for the entire length of that part of the spindle intended to engage the ground, said ground engaging portion being of downwardly decreasing generally circular cross section, and drive transmission means on said support connected to the spindles and to said drive mechanism for rotating said spindles.

13. An implement comprising a mobile support, including drive mechanism, a tool bar, means connecting the tool bar with the mobile support in a manner locating said tool bar in transverse relation to the line of travel of said mobile support, and in a manner affording vertical adjustment of said tool bar relative to said mobile support, means connected to said mobile support and to said tool bar for raising said tool bar at will, a plurality of tool supports fixed to said tool bar in laterally spaced relation to one another, each of said tool supports including a tubular bearing means fixed thereto, an elongated forwardly and downwardly directed spindle rotatably mounted in each of said tubular bearing means for projection at an angle suitable to provide soil penetration along a continuous path determined by the movement of said support along the ground, said spindles each including a smooth surfaced downwardly tapering ground engaging end portion extending for the entire length of that part of the spindle intended to engage the ground, said ground engaging portion being formed as a downwardly tapering paraboloid, and drive transmission means on said support connected to said spindle and to said drive mechanism for rotating said spindles.

References Cited by the Examiner

UNITED STATES PATENTS

| | | | |
|---|---|---|---|
| 980,803 | 1/11 | Lackie | 172—59 |
| 1,226,515 | 5/17 | Hicks | 111—1 |
| 1,506,042 | 8/24 | Bauer | 172—59 |
| 1,691,351 | 11/28 | Hicks | 172—111 |
| 1,725,190 | 8/29 | Hicks | 111—7 |
| 1,791,063 | 2/31 | Millen | 172—59 |
| 2,285,932 | 6/42 | Leavitt | 71—2.1 |
| 2,320,775 | 6/43 | Garner | 172—47 X |
| 2,593,679 | 4/52 | Kaupke | 172—316 |
| 2,691,358 | 10/54 | Peck | 111—7 |
| 2,779,259 | 1/57 | Kelsey | 172—41 |
| 2,782,739 | 2/57 | Freer | 111—7 |
| 2,784,530 | 3/57 | Dugan | 111—7 X |
| 2,874,656 | 2/59 | Bennett | 111—7 |
| 2,988,025 | 6/61 | Johnston | 111—6 |

FOREIGN PATENTS

| | | |
|---|---|---|
| 643,634 | 5/28 | France. |
| 934,959 | 11/55 | Germany. |
| 689,754 | 4/53 | Great Britain. |

ABRAHAM G. STONE, *Primary Examiner.*

A. JOSEPH GOLDBERG, WILLIAM A. SMITH, III, *Examiners.*